(12) United States Patent
Watanabe et al.

(10) Patent No.: US 9,193,410 B2
(45) Date of Patent: Nov. 24, 2015

(54) SCOOTER-TYPE ELECTRIC VEHICLE

(75) Inventors: Takato Watanabe, Tokyo (JP);
Katsuichi Yagisawa, Kawagoe (JP);
Hisashi Matsuo, Tokyo (JP); Hideki Inaizumi, Fujimi (JP)

(73) Assignee: HONDA MOTOR CO., LTD, Tokyo (JP)

( * ) Notice: Subject to any disclaimer, the term of this patent is extended or adjusted under 35 U.S.C. 154(b) by 255 days.

(21) Appl. No.: 13/819,589

(22) PCT Filed: Sep. 27, 2011

(86) PCT No.: PCT/JP2011/072077
§ 371 (c)(1),
(2), (4) Date: Feb. 27, 2013

(87) PCT Pub. No.: WO2012/043562
PCT Pub. Date: Apr. 5, 2012

(65) Prior Publication Data
US 2013/0161108 A1 Jun. 27, 2013

(30) Foreign Application Priority Data
Sep. 30, 2010 (JP) ................. 2010-220725

(51) Int. Cl.
*B62D 61/02* (2006.01)
*B62K 11/00* (2006.01)
(Continued)

(52) U.S. Cl.
CPC ............. *B62K 11/00* (2013.01); *B62J 11/00* (2013.01); *B62M 7/12* (2013.01); *B62K 2202/00* (2013.01); *B62K 2204/00* (2013.01); *B62K 2208/00* (2013.01)

(58) Field of Classification Search
CPC ............. B62M 7/12; B60K 2001/405; B60K 2001/416; B60K 2001/438; B60K 2001/422; B60L 11/1877
USPC ............................ 180/220, 68.5, 68.1, 207.3
See application file for complete search history.

(56) References Cited

U.S. PATENT DOCUMENTS 4,406,342 A * 9/1983 Lacroix .................. 180/220
5,207,288 A * 5/1993 Ono ....................... 180/220
(Continued)

FOREIGN PATENT DOCUMENTS

CN 1211517 A 3/1999
JP 04-043177 A 2/1992
(Continued)

OTHER PUBLICATIONS

Extended European Search Report dated Apr. 1, 2014, issued in European Patent Application No. 11829115.2 (7 pages).
(Continued)

*Primary Examiner* — Kevin Hurley
*Assistant Examiner* — Conan Duda
(74) *Attorney, Agent, or Firm* — Westerman, Hattori, Daniels & Adrian, LLP

(57) ABSTRACT

There is provided a battery unit in which at least three batteries are lined up in the vehicle widthwise direction and these are connected in series to supply electric power to a driving motor; among the respective batteries, center side batteries that are arranged on the vehicle center side, are arranged higher than side batteries that are arranged on the vehicle outer sides; and a breaker is fitted to the these center side batteries, on a connection path that connects the center side batteries.

7 Claims, 14 Drawing Sheets

(51) Int. Cl.
*B62M 7/12* (2006.01)
*B62J 11/00* (2006.01)

(56) References Cited

U.S. PATENT DOCUMENTS

| | | | |
|---|---|---|---|
| 5,323,869 A * | 6/1994 | Kurayoshi et al. | 180/219 |
| 5,421,427 A * | 6/1995 | Ogawa et al. | 180/220 |
| 5,477,936 A * | 12/1995 | Sugioka et al. | 180/68.5 |
| 5,513,721 A * | 5/1996 | Ogawa et al. | 180/220 |
| 5,527,637 A * | 6/1996 | Nakazawa et al. | 429/99 |
| 5,561,359 A * | 10/1996 | Matsuura et al. | 180/68.2 |
| 5,577,747 A * | 11/1996 | Ogawa et al. | 180/220 |
| 5,647,450 A * | 7/1997 | Ogawa et al. | 180/220 |
| 5,918,692 A * | 7/1999 | Sekita et al. | 180/56 |
| 6,328,121 B1 * | 12/2001 | Woodbury et al. | 180/65.1 |
| 6,624,610 B1 | 9/2003 | Ono et al. | |
| 2002/0005305 A1 * | 1/2002 | Hirayama et al. | 180/68.5 |
| 2002/0008397 A1 * | 1/2002 | Takahashi | 296/37.1 |
| 2004/0238253 A1 | 12/2004 | Yonehana et al. | |
| 2005/0092535 A1 * | 5/2005 | Nakagawa et al. | 180/68.5 |
| 2005/0092538 A1 * | 5/2005 | Baldwin et al. | 180/220 |
| 2005/0217910 A1 * | 10/2005 | Yonehana et al. | 180/68.5 |
| 2008/0204184 A1 * | 8/2008 | Lietz et al. | 337/290 |
| 2010/0078247 A1 * | 4/2010 | Sasage et al. | 180/220 |
| 2010/0078249 A1 * | 4/2010 | Nishiura et al. | 180/220 |
| 2010/0133030 A1 * | 6/2010 | Johnson et al. | 180/68.5 |

FOREIGN PATENT DOCUMENTS

| | | |
|---|---|---|
| JP | 04-358981 A | 12/1992 |
| JP | 5-105148 A | 4/1993 |
| JP | 5-112270 A | 5/1993 |
| JP | 07-117487 A | 5/1995 |
| JP | 3079227 B2 | 8/2000 |
| JP | 2004-352189 A | 12/2004 |
| JP | 2010-76531 A | 4/2010 |
| JP | 2010-083371 A | 4/2010 |

OTHER PUBLICATIONS

Chinese Office Action dated Apr. 8, 2014, issued in Chinese Patent Application No. 201180031378.2 with English translation (13 pages).

International Search Report of PCT/JP2011/072077, mailing date Dec. 27, 2011.

* cited by examiner

SCOOTER-TYPE ELECTRIC VEHICLE

TECHNICAL FIELD

The present invention relates to a scooter-type electric vehicle. Priority is claimed on Japanese Patent Application No. 2010-220725, filed Sep. 30, 2010, the contents of which are incorporated herein by reference.

BACKGROUND ART

Heretofore, there has been a scooter-type electric vehicle in which a battery is arranged along an under frame that is arranged at the bottom part of the vehicle (for example, refer to Patent Document 1).

In the technique disclosed in Patent Document 1, a plurality of batteries Ba are arranged along a center frame F2 on the underside of a floor board 85. The battery arranged in the widthwise center is large, and the batteries arranged on the left and right are small. As a result, it is possible to ensure a bank angle while ensuring battery capacity. A high voltage motor is operated by connecting these plurality of batteries in series.

PRIOR ART DOCUMENTS

Patent Documents

[Patent Document 1] Japanese Patent No. 3079227

DISCLOSURE OF INVENTION

Problems to be Solved by the Invention

However, in the cases where a plurality of batteries are connected in the vehicle body widthwise direction at a position that does not influence the bank angle, improved operation efficiency and improved operating posture of the operator connecting the batteries are desired, and in the cases of providing a breaker that disengages connection from the batteries, it is preferable that the breaker is fitted with the batteries at a position that takes into consideration water-exposure performance, assemblability, and maintainability of the breaker.

Consequently, an object of the present invention is to provide a scooter-type electric vehicle which enables a battery connection operation to be performed by an operator in a superior operating posture, while improving water-exposure performance, assemblability, and maintainability of the breaker to be attached to the batteries.

Means for Solving the Problem

In order to solve the above problem and achieve the above object, the present invention employs the following aspects. That is to say, (1) An aspect of the present invention is provided with: a vehicle body frame which has a down frame extending downbackward from a head pipe, and a lower frame extending backward from the lower end of this down frame; a seat, which is provided at the rear of the head pipe, for allowing a passenger to sit thereon; a step floor, which is provided between the head pipe and the seat, for allowing the passenger to place their feet thereon; and a battery unit in which at least three batteries are lined up in the vehicle widthwise direction and these are connected in series to supply electric power to a driving motor.

Among the respective batteries, center side batteries that are arranged on the vehicle center side are arranged higher than side batteries that are arranged on the vehicle outer sides, and a breaker is fitted to these center side batteries, on a connection path that connects the center side batteries.

The scooter-type electric vehicle includes not only two-wheeled motor vehicles but also three-wheeled (including ones with one front wheel and two rear wheels as well as ones with two front wheels and one rear wheel) and four-wheeled motor vehicles.

(2) In the aspect described in (1) above, the lower side surface of each side battery and the bottom surface of the center side batteries may form a space.

(3) In the aspect described in (1) above: there may be provided an under-seat cover which covers, below the seat, the rear of the step floor; in the under-seat cover there may be provided an opening which enables connection to be established from the space above the step floor to the breaker; and in the opening there may be provided a lid which opens and closes this opening.

(4) In the aspect described in (3) above, at a position facing the opening within the under-seat cover, there may be provided a recharging opening which enables recharging of the respective batteries.

(5) In the aspect described in (3) above, there may be provided a locking device capable of locking the lid.

(6) In the aspect described in (2) above, there may be further provided a driver which is provided above the battery unit and which controls the driving motor, and a unit swing type power unit which is swingably supported on the vehicle body frame and has the driving motor built-in; and a wiring which supplies electric power from the driver to the driving motor may extend from the vehicle widthwise one side of the driver and may extend toward the vehicle widthwise other side at the rear of the battery unit to be guided into the unit swing type power unit.

(7) In the aspect described in (1) above, there may be further provided steps for allowing a passenger sitting on the rear part of the seat to place their feet thereon, and the steps may be arranged at positions, when viewed from the side, at the upper rear of the battery unit which do not overlap with the battery unit.

(8) In the aspect described in (7) above, there may be further provided a rear frame which extends upward at a backward angle from the rear end of the lower frame, at least a part of the rear frame may be exposed to the outside of the vehicle body from a vehicle body cover, and the steps may be supported at this exposed part of the rear frame.

Effect of the Invention

According to the aspect of (1) above, since the upper surfaces of the side batteries on the vehicle outer side are low, when performing a connecting operation for the center side batteries on the vehicle body center side, the side batteries are unlikely to become an obstacle and the operation can be performed efficiently. In addition, with a breaker being fitted, the serial connection of the respective batteries can be cut off easily, and in this state, an operator can smoothly perform an operation of battery unit attachment and detachment.

Moreover, as a result of the breaker being provided on the connection path of the center batteries, the breaker is arranged at a comparatively high position, enabling an operation to be performed in a superior posture compared to the case of a breaker being arranged at a low position. Furthermore, as a result of the breaker being arranged at a comparatively high position, it is possible to suppress the level of water exposure influence being exerted thereon.

According to the aspect of (2) above, since the bottom surfaces of the side batteries on the transversely outer sides are low, a space can be formed by the lower inner side surface of the side battery on each transversely outer side and the bottom surface of the center side battery on each transversely inner side, and members such as wiring and cables can be arranged in this space.

According to the aspect of (3) above, an operation of breaker disconnection can be easily performed, and also, the breaker can be covered and hidden when no operation is being performed.

According to the aspect of (4) above, an operation of recharging each battery can be easily performed, and also the recharging opening can be covered and hidden when recharging has been completed.

According to the aspect of (5) above, disturbances to the breaker and the recharging opening can be prevented by locking the lid.

According to the aspect of (6) above, with the driver being arranged in the vicinity of the battery unit, high voltage wiring can be shortened to the greatest possible extent. Moreover, the wiring which connects between the driver and the driving motor is such that a portion thereof which extends along the vehicle widthwise direction at the rear of the battery unit can absorb torsion associated with swing of the unit swing type power unit, and it is therefore possible to mitigate force exerted in the flexing direction.

According to the aspect of (7) above, when an external force is applied from the side of the vehicle body, it is possible to prevent the external force from reaching the battery unit via the step.

According to the aspect of (8) above, it is possible to eliminate the need for providing holes or the like in the vehicle body for fitting the steps.

DESCRIPTION OF THE EMBODIMENT

Hereunder, an embodiment of the present invention is described, with reference to the drawings. The orientations in the following description such as front, rear, left, and right are treated as being the same as the orientations in the vehicle described below unless described particularly. Moreover, in suitable locations in the figures used in the following description, there are shown an arrow FR which denotes the vehicle front side, an arrow LH which denotes the vehicle left side, and an arrow UP which denotes the vehicle upper side.

Figure 1:
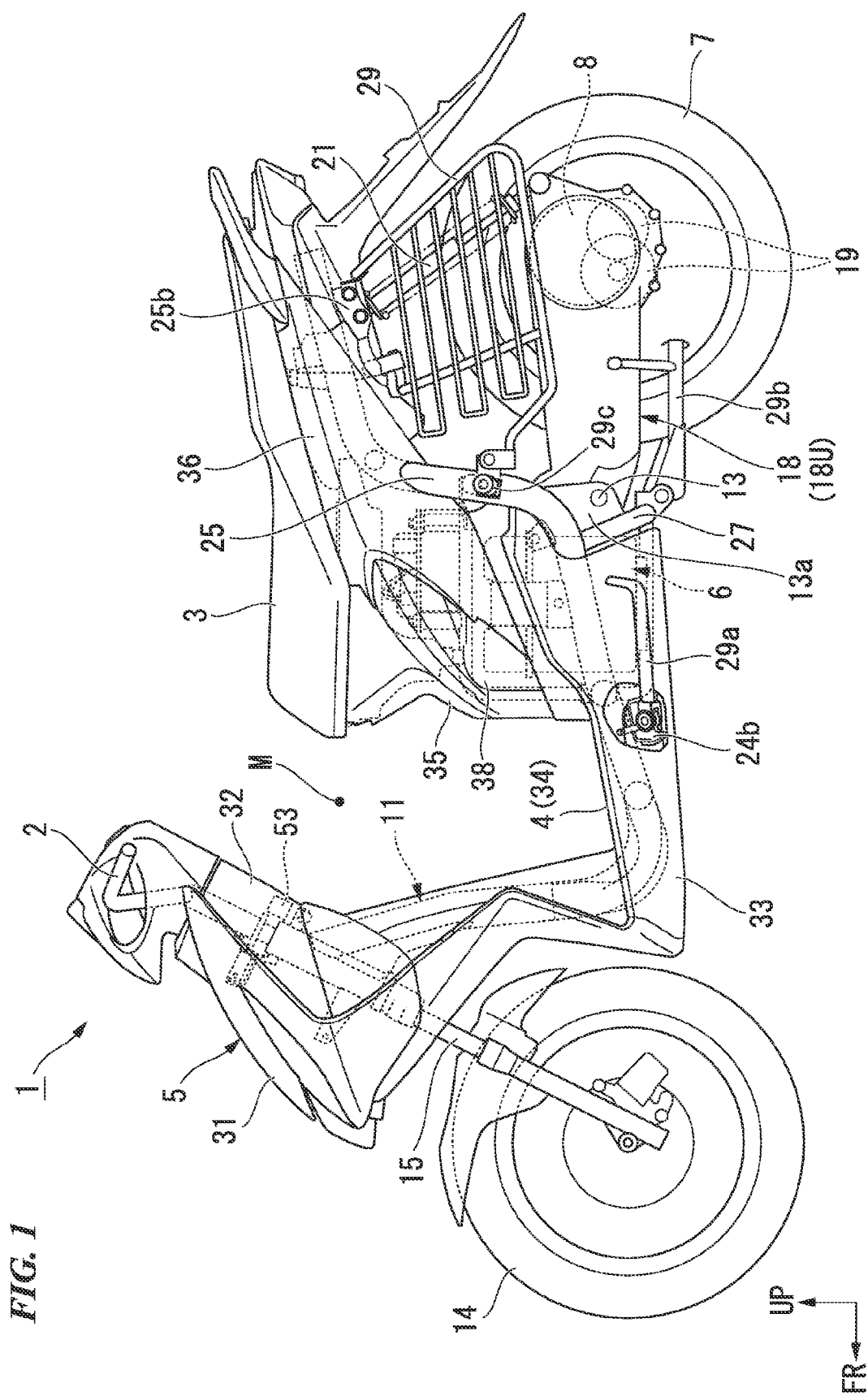
FIG. 1 is a left side view of a two-wheeled motor vehicle in an embodiment of the present invention.
Figure 2:
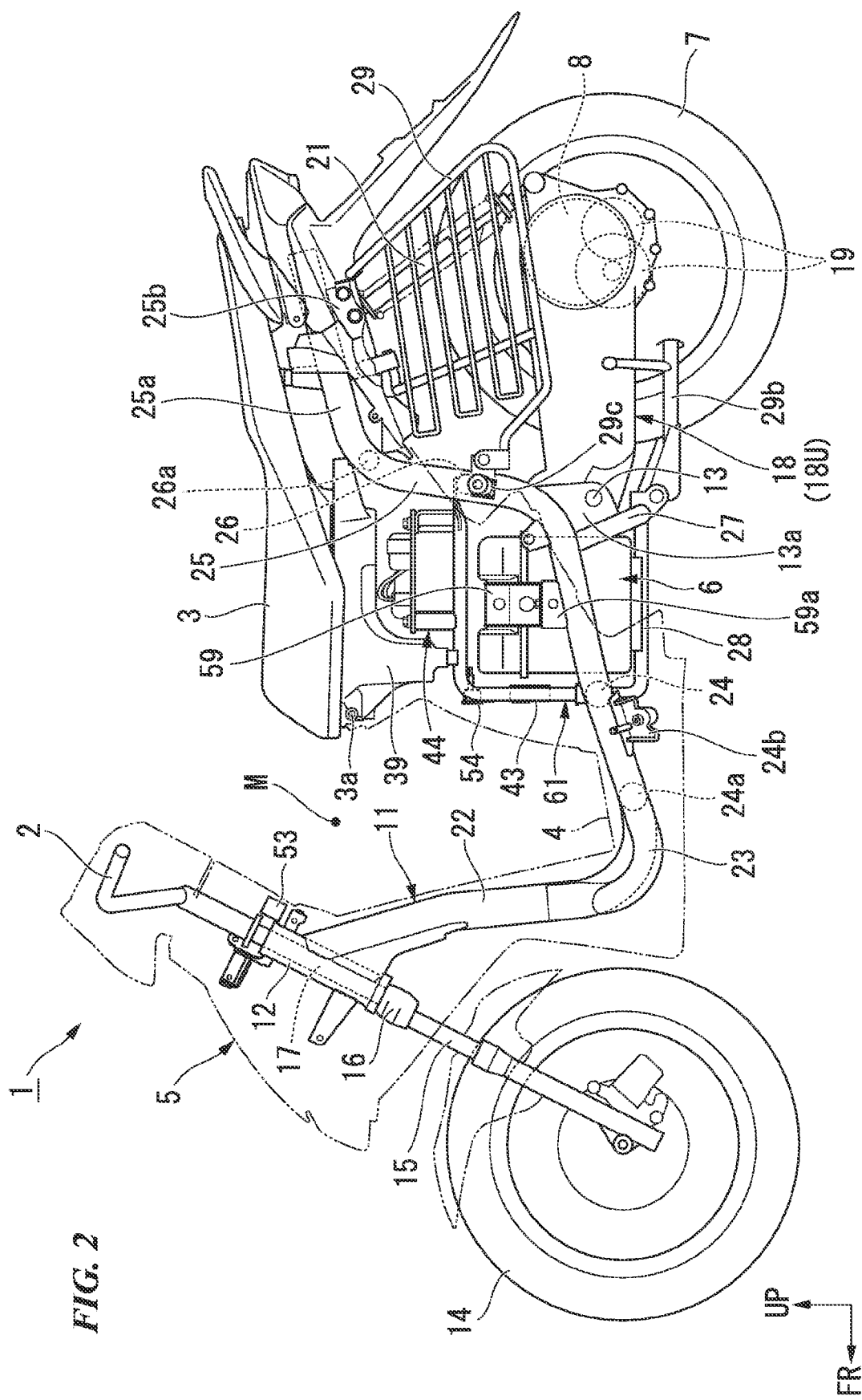
FIG. 2 is a left side view of the two-wheeled motor vehicle in a state where a vehicle body cover is removed therefrom.

A scooter-type two-wheeled motor vehicle 1 shown in FIG. 1 and FIG. 2 is provided with a step floor 4 which is provided between a bar handle 2 for vehicle steering and a seat 3 for allowing a passenger to sit thereon, and which serves as a low floor part on which the passenger places their feet, and a vehicle body cover 5 which almost entirely covers the vehicle body. Reference symbol M in the figure denotes a straddle space above the step floor 4.

In a position at the rear of the step floor 4 there is mounted a battery unit 6. A driving motor 8 on the left side of a rear wheel 7, which is the driving wheel, drives upon receiving electric power from this battery unit 6, and this driving power drives the rear wheel 7, thereby causing the two-wheeled motor vehicle 1 to travel. That is to say, the two-wheeled motor vehicle 1 is configured as a scooter-type electric vehicle.

A vehicle body frame 11 of the two-wheeled motor vehicle 1 is composed such that several types of steel materials are integrally joined by means of welding or the like. At the front end part of the vehicle body frame 11 there is provided a head pipe 12 which steerably supports a front wheel suspension system. On the lower rear side of the vehicle body frame 11 there is supported a pivot 13 which is capable of vertically swinging a rear wheel suspension system.

The front wheel suspension system has: left and right front fork legs 15 which rotatably bear a front wheel 14 at the lower end part thereof a bridge member 16 which fixes the upper end parts of these left and right front fork legs 15; and a step pipe 17 which extends upward from the transversely center part of this bridge member 16. The step pipe 17 is relatively rotatably inserted into the head pipe 12 from the lower side thereof. The upper end part of the step pipe 17 projects to the upper side of the head pipe 12, and the bar handle 2 is fixed on this projected portion.

The rear wheel suspension system is provided with a swing arm 18 which rotatably bears the rear wheel 7 at the rear end part thereof. The swing arm 18 forms a swing unit 18U which has the driving motor 8 and a gear mechanism (speed reducer) 19 built-in at the rear end part of the left arm thereof. The front end part of the swing unit 18U is up-down swingably supported on the lower rear side of the vehicle body frame 11 via the pivot 13. The rear end part of the swing unit 18U is elastically supported on the upper rear side of the vehicle body frame 11 via a cushion unit 21.

Figure 3:
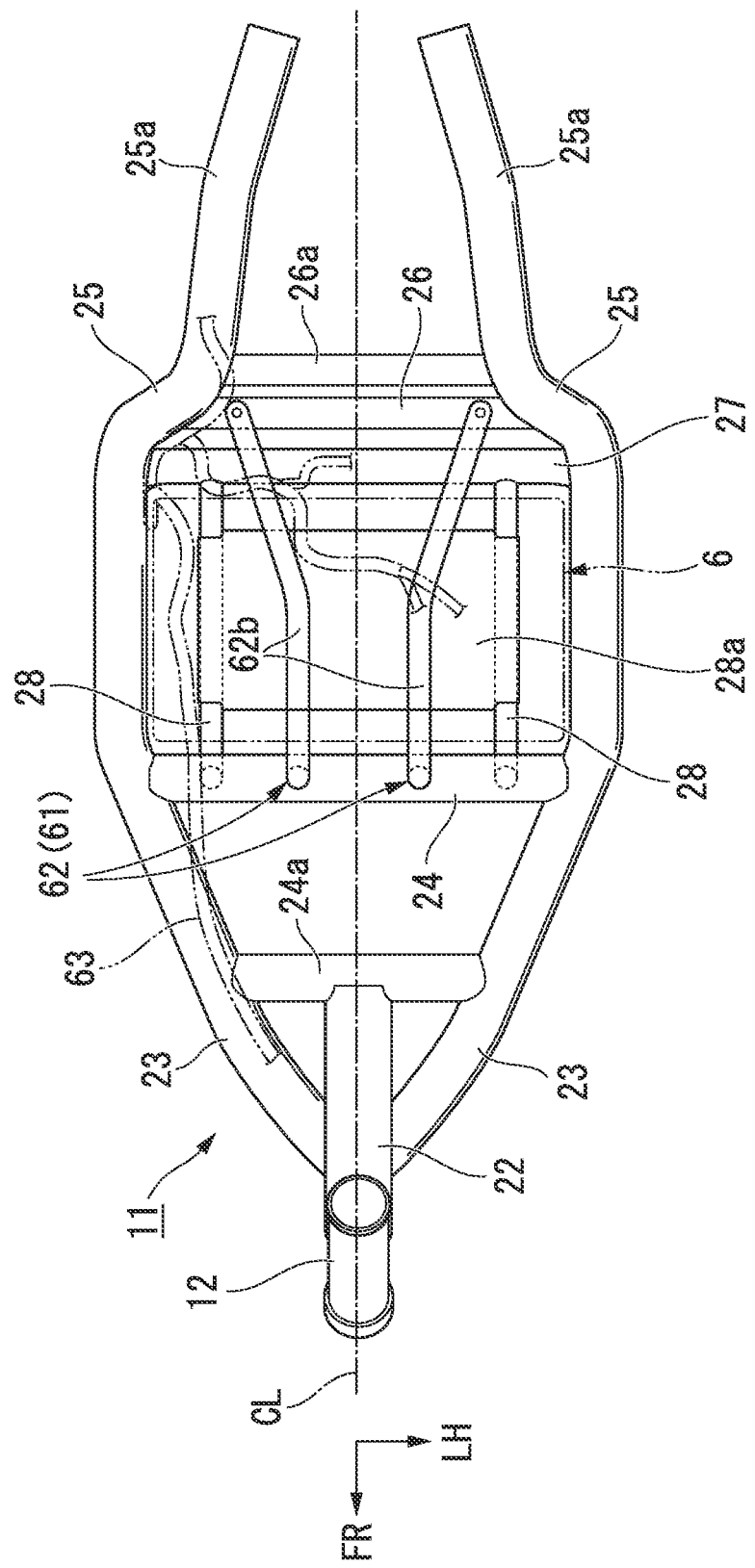
FIG. 3 is a top view of a vehicle body frame of the two-wheeled motor vehicle.

As shown in FIG. 2 and FIG. 3, the vehicle body frame 11 is provided with: the head pipe 12; a single down frame 22 the upper end (front end) of which is joined with the rear part of this head pipe 12, and which extends, in the transversely center of the vehicle body, diagonally down-backward from the rear part of this head pipe 12; and a pair of left and right lower frames 23 the front ends of which are joined with both sides of the lower part of this down frame 22, and which branch to the left and right from the lower part of this down frame 22 and extend backward at a rear-upward angle. The lower end part of the down frame 22 and the front end parts of the lower frames 23 are bent in an L shape when viewed from the side of the vehicle while overlapping with each other when viewed from the side of the vehicle. The front end parts of the lower frames 23 are joined with the lower part of the down frame 22. The line CL in FIG. 3 and other figures denotes the transversely center line of the vehicle body.

Making reference to FIG. 3, the left and right lower frames 23 are such that the front half parts thereof extend backward at an angle so that they are positioned more on the transversely outer side with approach to the rear side, and the rear half parts thereof extend backward in parallel with the vehicle body center plane (denoted with the center line CL). The front-rear intermediate parts of the left and right lower frames 23 are connected by a center cross pipe 24, which is parallel with the left-right direction. The front parts of the left and right lower frames 23 are connected by a front cross pipe 24a, which is parallel with the left-right direction. The rear parts of the left and right lower frames 23 are connected by a rear lower pipe 27, both end sections of which extend diagonally down-backward and the center part of which extends to left and right.

Making reference also to FIG. 1 and FIG. 2, to the transversely center of the front cross pipe 24a there is butted and joined from the front side, the lower end (rear end) of the down frame 22. On the front-rear intermediate part of the left lower frame 23 there is fixed a side stand bracket 24b which rotatably supports a side stand 29a. The rear parts of the left and right lower frames 23 form the maximum width of the vehicle body frame 11, and between the rear parts of the left and right lower frames 23, and between the center cross pipe 24 and the rear lower pipe 27 there is mounted the battery unit 6.

The rear end parts of the left and right lower frames 23 are bent upward, and to these rear end parts there are integrally connected the lower end parts of left and right rear frames 25 which extend upward with a slightly backward angle. The upper end parts of the left and right rear frames 25 are bent backward, and to these upper end parts there are integrally connected the front end parts of left and right seat frames 25a which extend backward with a slightly rear-upward angle. The left and right rear frames 25 are angled so as to be positioned more on the transversely inner side with approach to the upper side (refer to FIG. 5), and the left and right seat frames 25a are angled so as to be positioned more on the transversely inner side with approach to the rear side.

In the figure, reference symbol 26 denotes a rear lower cross pipe which connects between vertically intermediate parts of the left and right rear frames 25, and reference symbol 26a denotes a rear upper cross pipe which connects between the upper end parts of the left and right rear frames 25. On the lower side of the left and right seat frames 25a, there are respectively fixed left and right cushion brackets 25b which support the upper end parts of left and right cushion units 21. On the left cushion bracket 25b there is supported the upper end part of a dress guard 29.

Figure 6:
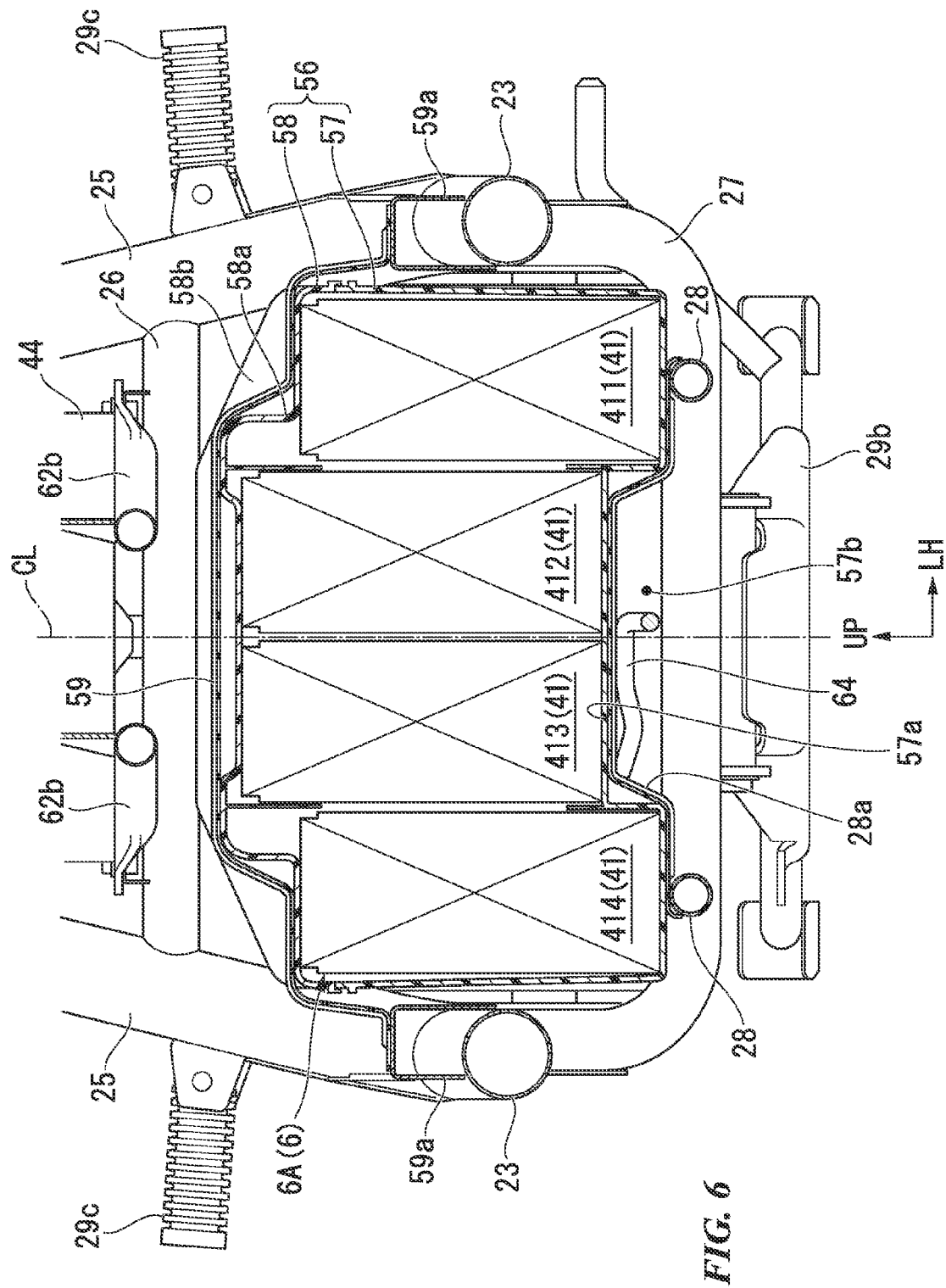
FIG. 6 is a sectional view of the periphery of a battery unit of the vehicle body rear part.

As shown in FIG. 2 and FIG. 6, the rear lower pipe 27 is formed in a U shape which opens upward when viewed from the front by having both sides of the main part, which is parallel with the left and right direction, bent upward. Both of the side parts of the rear lower pipe 27 extend upward with a slightly forward angle, and the tip ends thereof are butted from the lower side and joined with the rear end parts of the left and right lower frames 23. To the rear sides of both of the side parts of the rear lower pipe 27 there are respectively joined the front end parts of the left and right pivot brackets 13a. The upper end parts of the left and right pivot brackets 13a are respectively joined with the lower end parts of the left and right lower frames 23. On these left and right pivot brackets 13a there are supported the pivot 13. On the rear lower pipe 27 there is rotatably supported a main stand 29b.

As shown in FIG. 2 and FIG. 3, on both left and right sides of the rear lower pipe 27 there are butted and joined from the front, the rear ends of left and right under pipes 28 which extend in the front-rear direction. The front end parts of the left and right under pipes 28 are bent upward, and the tip ends thereof are butted and joined from the lower side with both of the left and right sides of the center cross pipe 24. Between the left and right under pipes 28 there is spanned a step-shaped supporting plate 28a, the transversely inner side of which is displaced upward with respect to the transversely outer sides, as with a bottom wall 57a of a battery case 56 described later. The battery unit 6 is mounted on these left and right under pipes 28 and the supporting plate 28a. Frames 22, 23, 25, and 25a and pipes 24, 24a, 26, 26a, 27, and 28 are respectively composed of a round steel pipe for example.

As shown in FIG. 1 and FIG. 2, at the rear of the head pipe 12 there is arranged the seat 3 via the straddle space M. The seat 3 has, for example, a driver seating surface and a passenger seating surface that are integrated one behind the other, and it extends to the vicinity of the rear end of the vehicle body. The seat 3 also functions as a lid (cover) which opens and closes the upper opening of a goods storage box 39 positioned below the front part thereof. In the figure, reference symbol 3a denotes a rotation shaft which rotatably connects the lower side of the front end part of the seat 3 with the front end part of the goods storage box 39.

The vehicle body cover 5 has: a front cover 31 which covers the periphery of the head pipe 12 and the down frame 22, from the front side thereof; a front inner cover 32 which covers the periphery of the head pipe 12 and the down frame 22, from the rear side thereof; an under cover 33 which covers the periphery of the left and right lower frames 23, from the lower side to the transversely outer side thereof; and a step floor cover 34 which covers the periphery of the left and right lower frames 23, from the upper side thereof so as to form the step floor 4.

Moreover, the vehicle body cover 5 has: a rear center cover 35 which rises from the rear part of the step floor cover 34 toward the front lower end of the seat 3, and which covers the battery unit 6, a control unit 44 thereabove, and the goods storage box 39, from the front side thereof, and left and right rear side covers 36 which extend diagonally up-backward from the left and right side parts of the rear center cover 35 so as to continue therefrom, and which, below the rear part both sides of the seat 3, cover the periphery of the left and right rear frames 25 and the seat frame 25a, from the transversely outer side thereof. The respective covers 31 through 36 are composed of a synthetic resin for example.

The step floor cover 34 forms the step floor 4 which is slightly tilted forward with respect to the horizontal direction between the front inner cover 32 and the rear center cover 35. The rear end parts of the left and right lower frames 23, the lower parts of the left and right rear frames 25, the left and right pivot brackets 13a, and a rear lower frame are not covered by the vehicle body cover 5, and are exposed to the outside thereof (outside the vehicle body). In the vicinity of the end part of the rear lower cross pipe 26 where portions of the left and right rear frames 25 are exposed, there are supported folding type left and right steps 29c, which can be used by a rear passenger. In the vicinity of the left step 29c there is supported the front end part of the dress guard 29.

The left and right steps 29c are arranged, when viewed from the side of the vehicle, at positions at the upper rear of the battery unit 6 which do not overlap with the battery unit 6.

Therefore, even if an external force is applied to the left and right steps 29c, which respectively project outward in the vehicle widthwise direction of the left and right rear frames 25, and the left and right rear frames 25 are deformed inward in the vehicle widthwise direction, concentrated application of the external force to the battery unit 6 is prevented. Moreover, since the left and right rear frames 25 are tilted so as to be positioned more on the transversely inner side with approach to the upper side thereof (so that the distance between the left and right rear frames 25 becomes shorter in the left-right direction), the vehicle body width in the periphery of the left and right steps 29c is suppressed as the positions of the left and right steps 29c approach to the upper side.

Figure 5:
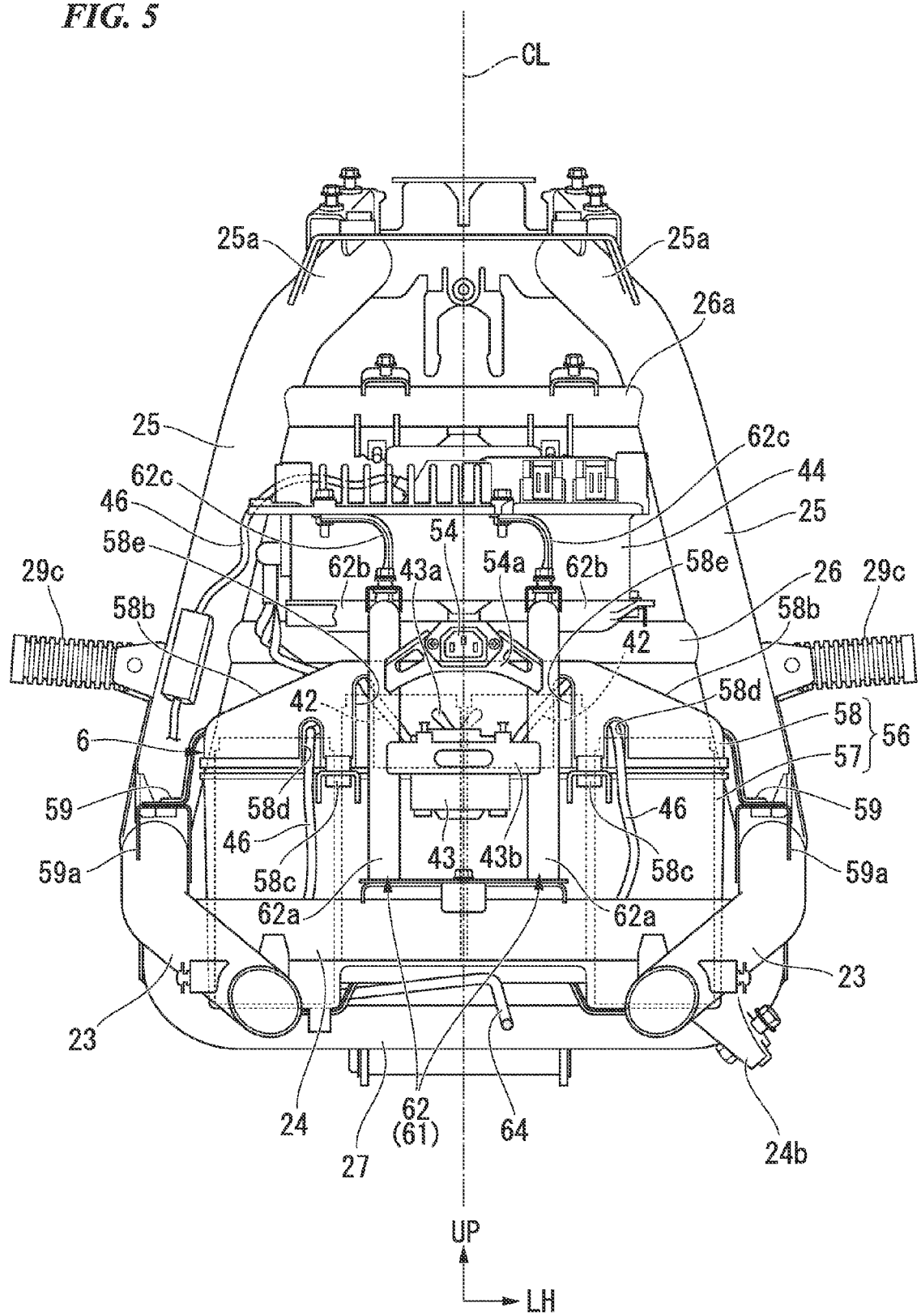
FIG. 5 is a front view of the vehicle body rear part in a state where the vehicle body cover is removed therefrom.
Figure 7:
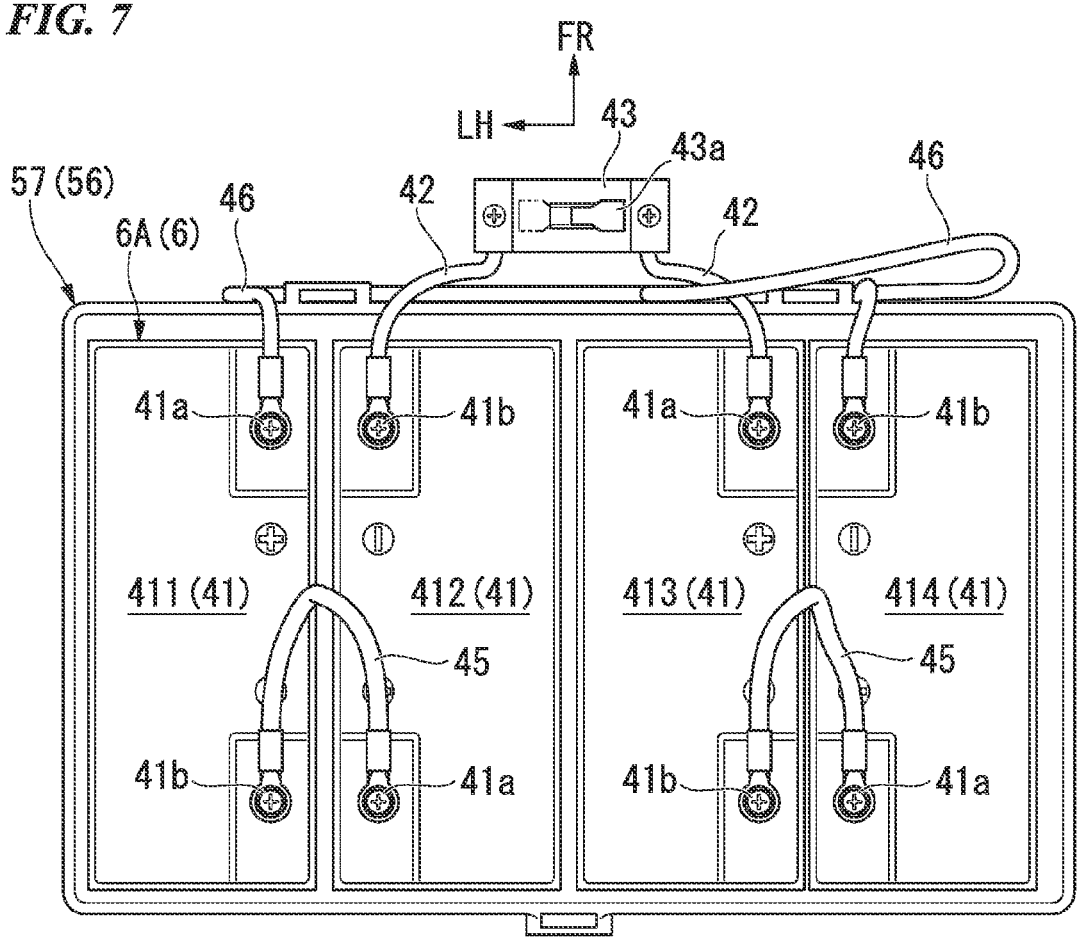
FIG. 7 is a plan view of high voltage batteries and associated components thereof of the battery unit.

As shown in FIG. 5, FIG. 6, and FIG. 7, the battery unit 6 is such that, for example, four 12V lead batteries 41 are lined up along the vehicle widthwise direction (left-right direction) and are connected in series to thereby configure a 48V high-voltage battery 6A, and further, this high voltage battery 6A is housed within a single battery case 56. Electric power is supplied from this battery unit 6 to the driving motor 8 via the control unit (driver) 44, to thereby drive the driving motor 8 and cause the two-wheeled motor vehicle 1 to travel.

Making reference to FIG. 7, each lead battery 41 is of a rectangular solid shape of which is rectangular, and at positions at both end parts on one long edge of the rectangle, there is provided a positive terminal 41a and a negative terminal 41b. Each battery 41 is such that the positive terminal 41a and the negative terminal 41b are respectively facing upward and are arranged one behind the other, and also, long edges of the rectangle are adjacent to each other and are lined up along the vehicle widthwise direction. The respective lead batteries 41 are arranged so that the positive terminals 41a and the negative terminals 41b are alternated front to rear for adjacent lead batteries 41. That is to say, the lead batteries 41 are arranged so that the long edges, on which the positive terminals 41a and the negative terminals 41b are arranged, face each other. Hereunder, the respective batteries 41 are shown sequentially from the left with reference symbols 411, 412, 413, and 414.

The pair of lead batteries 412 and 413 positioned on the transversely inner side in the high voltage battery 6A are lined up in a manner such that the long edges opposite to the long edges with the respective terminals 41a and 41b positioned thereon, are adjacent to each other when viewed in plan view. The positive terminal 41a and the negative terminal 41b positioned on the front side of the respective long edges of these lead batteries 412 and 413, are connected to each other via an intermediate cable 42.

The intermediate cable 42 has a circuit breaker 43, and this circuit breaker 43 is arranged at a transversely intermediate position on the upper front side of the battery case 56 (refer to FIG. 5). The circuit breaker 43 engages and disengages connection at the intermediate portion of the high voltage battery 6A, by left-right swing operations (engaging and disengaging operations of the circuit breaker 43) of a lever 43a, which projects upward from the upper part thereof.

Making reference to FIG. 6, the battery case 56 is composed of for example, a synthetic resin, and it has a case main body 57 which opens upward, and a case cover 58 which closes the upper opening thereof. The case main body 57 is of a transversely long rectangular solid box which corresponds to the outer shape of the high voltage battery 6A (refer to FIG. 7), and the bottom wall 57a thereof is formed in a stepped manner with the transversely inner side portion displaced upward with respect to the transversely outer side portions, conforming to the vertically displaced arrangement of the respective lead batteries 41 as described later.

Figure 9:
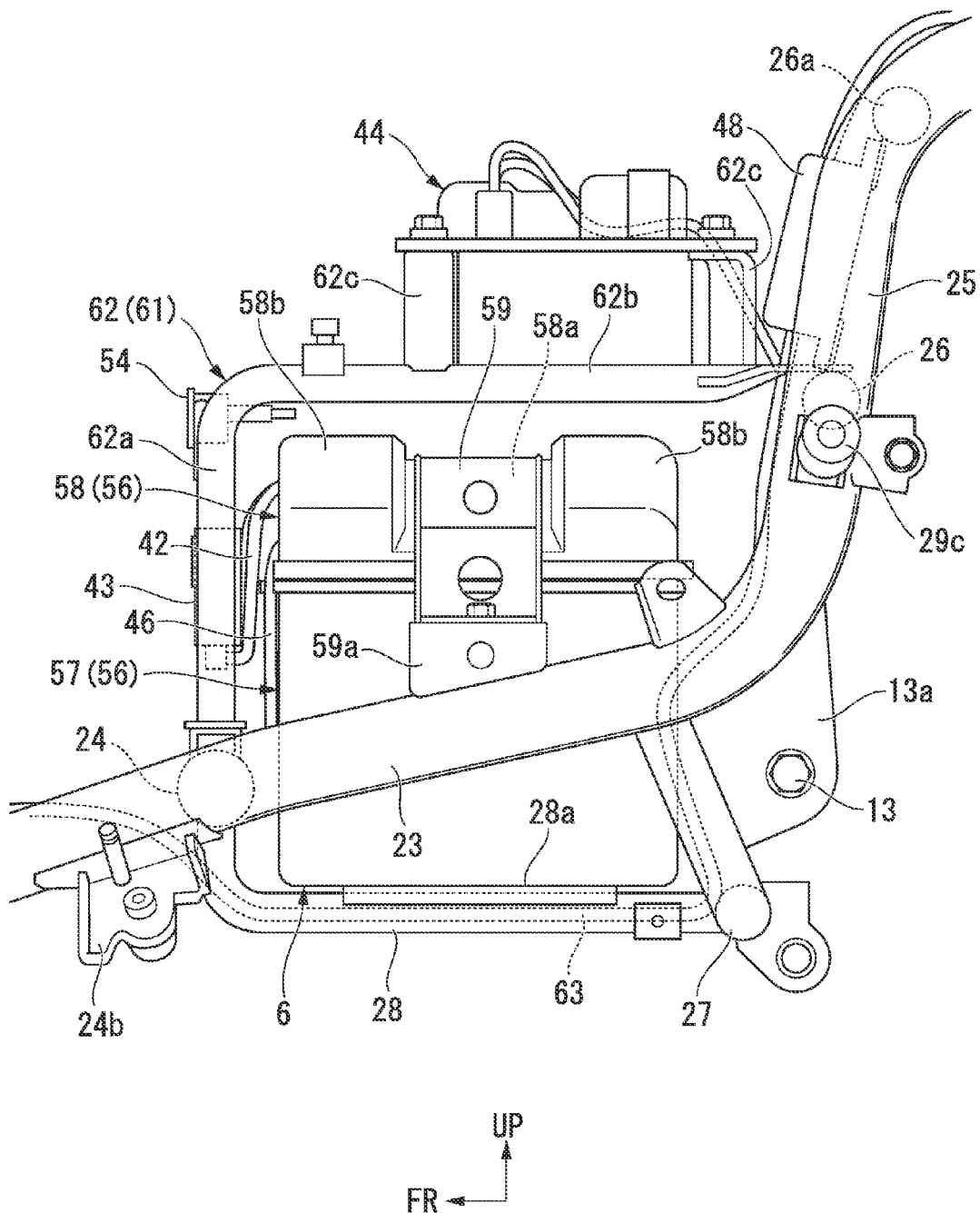
FIG. 9 is an enlarged view of the main part of FIG. 2.
Figure 10:
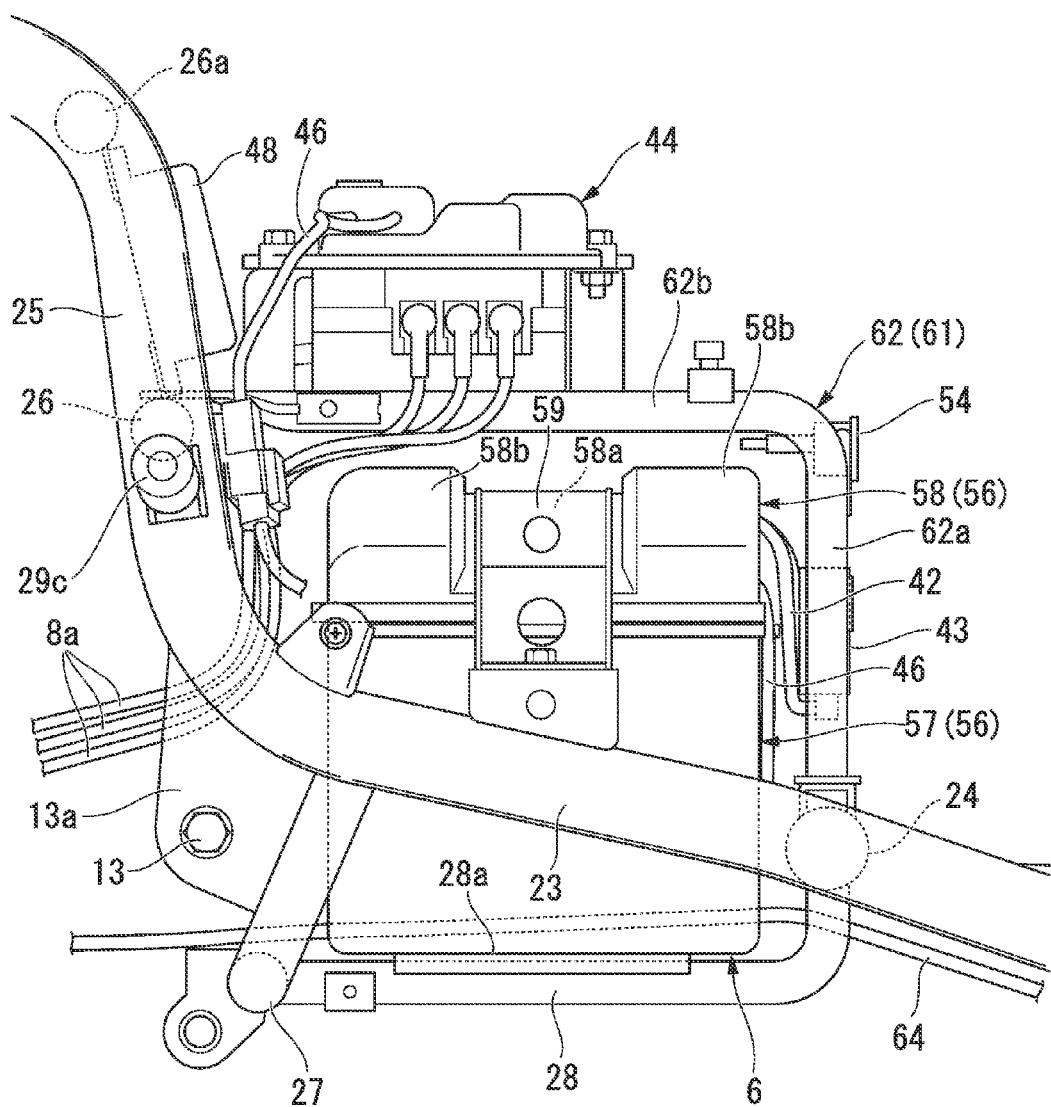
FIG. 10 is a right side view of FIG. 9.

Making reference also to FIG. 9 and FIG. 10, at the longitudinally intermediate part of the case cover 58 there is formed a retention part 58a formed in a stepped manner with the transversely inner side thereof displaced upward so as to correspond to the arrangement of the respective lead batteries 41. The retention part 58a contacts with the upper surface of the respective lead batteries 41 to thereby press and retain these batteries.

At the front part and the rear part of the case cover 58 there is provided a terminal accommodating part 58b which projects upward from the retention part 58a. The terminal accommodating part 58b is of a trapezoidal shape with a substantially horizontal upper edge and angled edges connecting to both sides thereof when seen in front view, and it accommodates therein the periphery of the positive terminal 41a and the negative terminal 41b of each lead battery 41.

The case cover 58 is fixed on the upper part of the case main body 57 by a plurality of locking claws 58c or the like (refer to FIG. 5). On the retention part 58a of the case cover 58 there is attached from thereabove a strip-shaped metal retention fitting 59, which is formed corresponding to the stepped shape thereof. In a state with the battery unit 6 mounted on the left and right under pipes 28 and the supporting plate 28a, it is fixedly retained on the vehicle body frame 11 by fastening both of the side parts of the metal retention fitting 59 to brackets 59a on the left and right lower frames 23.

As shown in FIG. 1 and FIG. 2, the battery unit 6 is arranged below the seat 3 and to the rear side of the front end thereof. Because the battery unit 6 has a predetermined height, the upper surface thereof is arranged above the upper surface of the step floor 4, and the lower surface thereof is arranged below the upper surface of the step floor 4.

Figure 4:
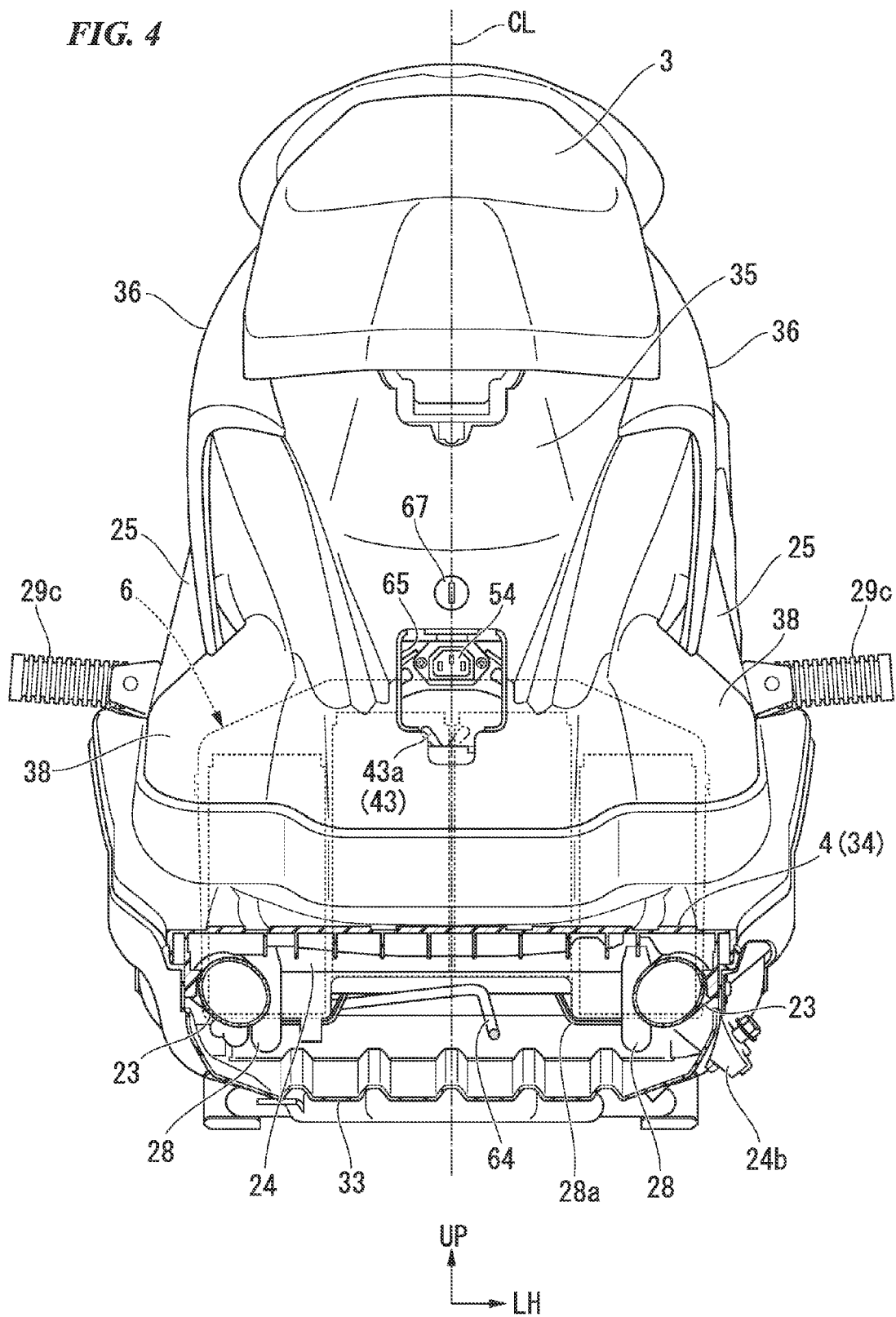
FIG. 4 is a front view of a vehicle body rear part of the two-wheeled motor vehicle.

As shown in FIG. 4, the battery unit 6 has a transverse width greater than that of the seat 3, and as shown in FIG. 3 and FIG. 5 it is accommodated within the transversely inner side width of the rear part of the left and right lower frames 23. Moreover, as shown in FIG. 4 and FIG. 5, corner parts of the upper outer side of the battery unit 6 (terminal accommodating part 58) are each formed with an obtuse angle when seen in front view, and projecting parts 38 that span from the center cover 35 to the rear side covers 36 are formed so as to accommodate both of these corner parts (refer to FIG. 11).

Figure 12:
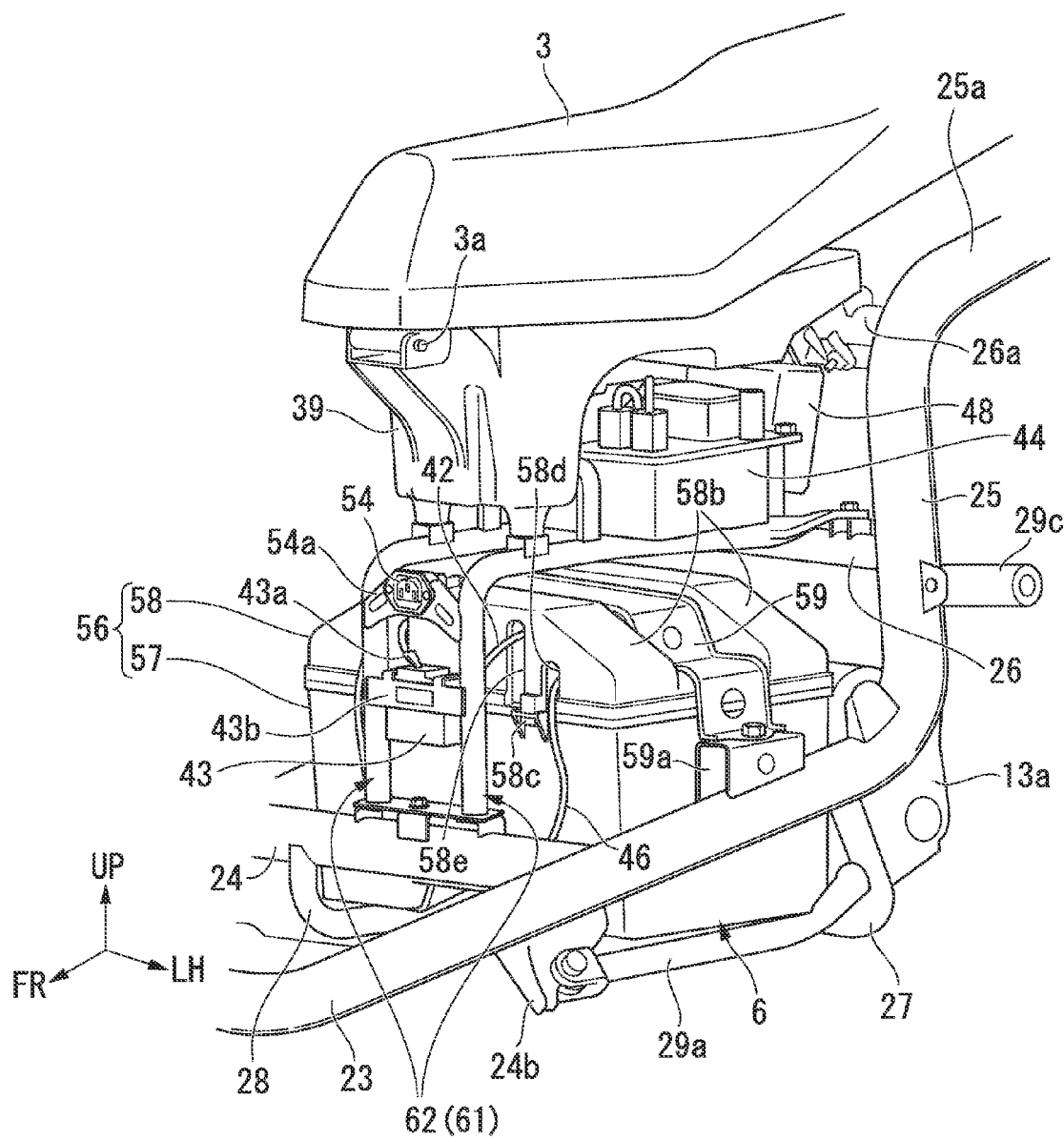
FIG. 12 is a perspective view of the vehicle body rear part in a state where the vehicle body cover is removed therefrom.

As shown in FIG. 9, FIG. 10, and FIG. 12, the control unit 44 and the goods storage box 39 above the battery unit 6 are supported by a supporting frame 61 which is formed in an L shape along the front surface and the upper surface of the battery unit 6 when seen in side view.

The supporting frame 61 has a pair of left and right frame pipes 62 that are formed in the above L shape. Each of the left and right frame pipes 62 is composed of a round steel pipe, and it integrally has a front perpendicular part 62a extending perpendicularly in front of the battery unit 6, and an upper horizontal part 62b extending substantially horizontally above the battery unit 6.

Figure 15:
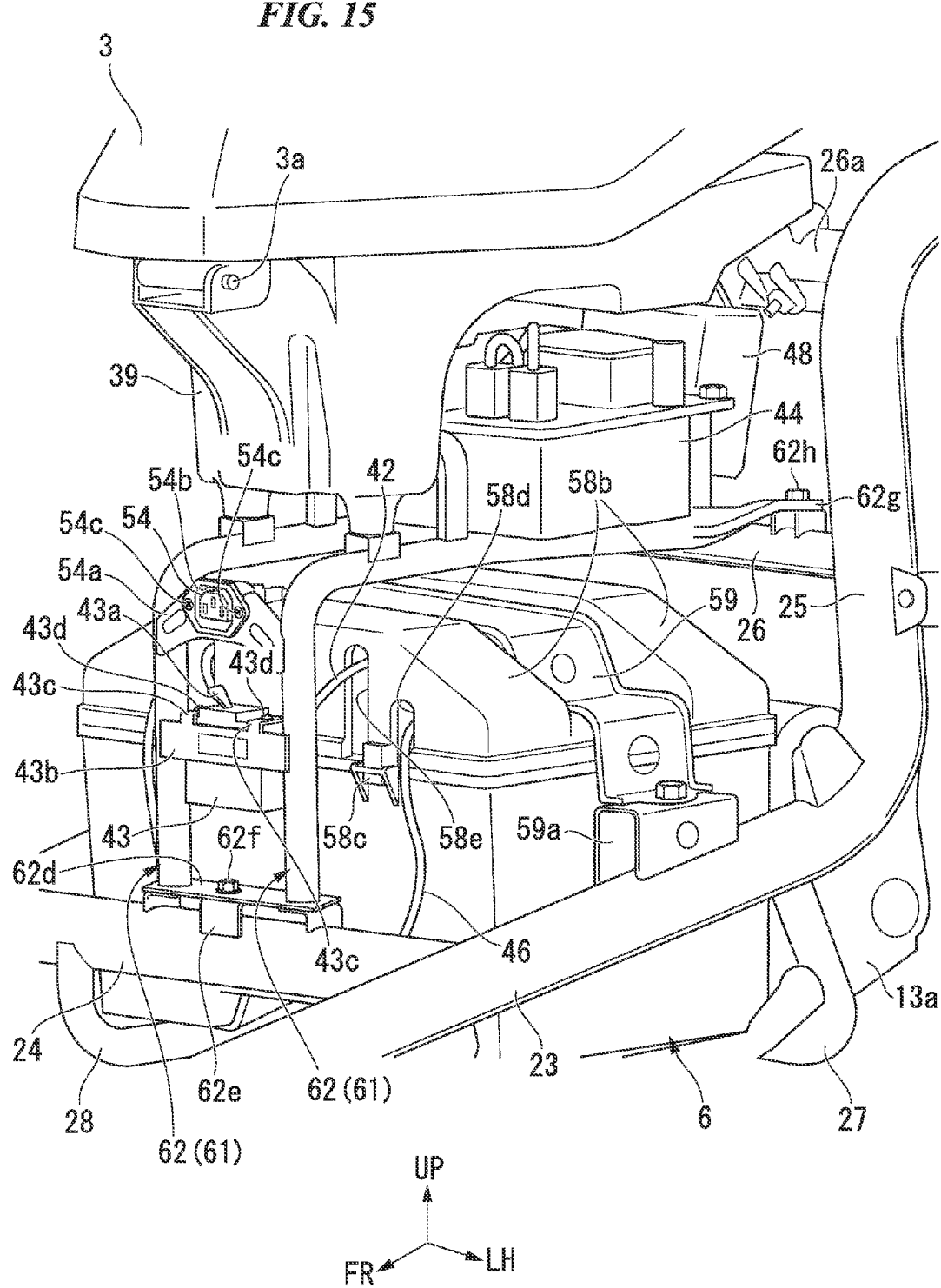
FIG. 15 is an enlarged view of the main part of FIG. 12.

Making reference also to FIG. 15, the lower ends of the left and right front perpendicular parts 62a are butted from above and welded to both sides of a substantially horizontal transversely long plate 62d. The plate 62d contacts from above, the upper surface of a bracket 62e on the center cross pipe 24, and the intermediate part of this plate 62d is detachably fastened with a bolt 62f inserted from thereabove. Moreover, a rear end part 62g of the upper horizontal part 62b is vertically crushed and formed in a substantially horizontal and flat shape, and this rear end part 62g contacts from above, with the rear cross pipe 26 and is detachably fastened with a bolt 62h inserted from thereabove. The supporting frame 61 can be attached to and detached from the vehicle body frame 11 by attaching or detaching the respective bolts 62f and 62h.

Making reference also to FIG. 3 and FIG. 5, the front half part of the upper horizontal part 62b and the front perpendicular part 62a are provided along the vehicle body center plane within the transverse width of the pair of lead batteries 412 and 413 on the transversely inner side of the battery unit 6. On the other hand, the rear half part of the upper horizontal part 62b is provided being angled when seen in plan view so as to be positioned more on the transversely outer side with approach to the rear side.

Making reference to FIG. 12, on the front half part of the upper horizontal part 62b there is supported the front part of the goods storage box 39. Moreover, making reference to FIG. 5, on the rear half part of the upper horizontal part 62b there is supported the control unit 44 via, for example, stays 62c that are formed in an L shape when seen in front view.

The control unit 44 is a driver for the driving motor 8, and it integrally has a PDU (power drive unit) 47 and an ECU 49. The rear part of the goods storage box 39 is supported on the rear upper cross pipe 26a.

As shown in FIG. 5 and FIG. 7, in the lead batteries 411 and 414 positioned on the most outer side of the battery unit 6, output cables 46 are connected respectively to the positive terminal 41a and the negative terminal 41b positioned on the front side thereof. Each of these output cables 46 is guided to the outside of the battery case 56 through a vertically long outer slit 58d that is formed on both sides of the front surface of the case cover 58 of the battery case 56.

Each output cable 46 is arranged, for example, through the vehicle body lower part first, and then appropriately to the upper right side of the vehicle body, to be connected to the control unit 44 above the battery unit 6. On both sides of the front surface of the case cover 58, on the transversely inner side of the outer slit 58d, there is formed a vertically long inner slit 58e, which is longer than the outer slit 58d, and the intermediate cable 42 is guided to the outside of the battery case 56 through this inner slit 58e.

Making reference to FIG. 7, the left side pair of lead batteries 411 and 412 and the right side pair of lead batteries 413 and 414 of the high voltage battery 6A are lined up so that the long edges having the respective terminals 41a and 41b are adjacent to each other when seen in plan view. The positive terminal 41a and the negative terminal 41b positioned on the rear side of each pair of lead batteries 41 are connected to each other via a connection cable 45.

Figure 13:
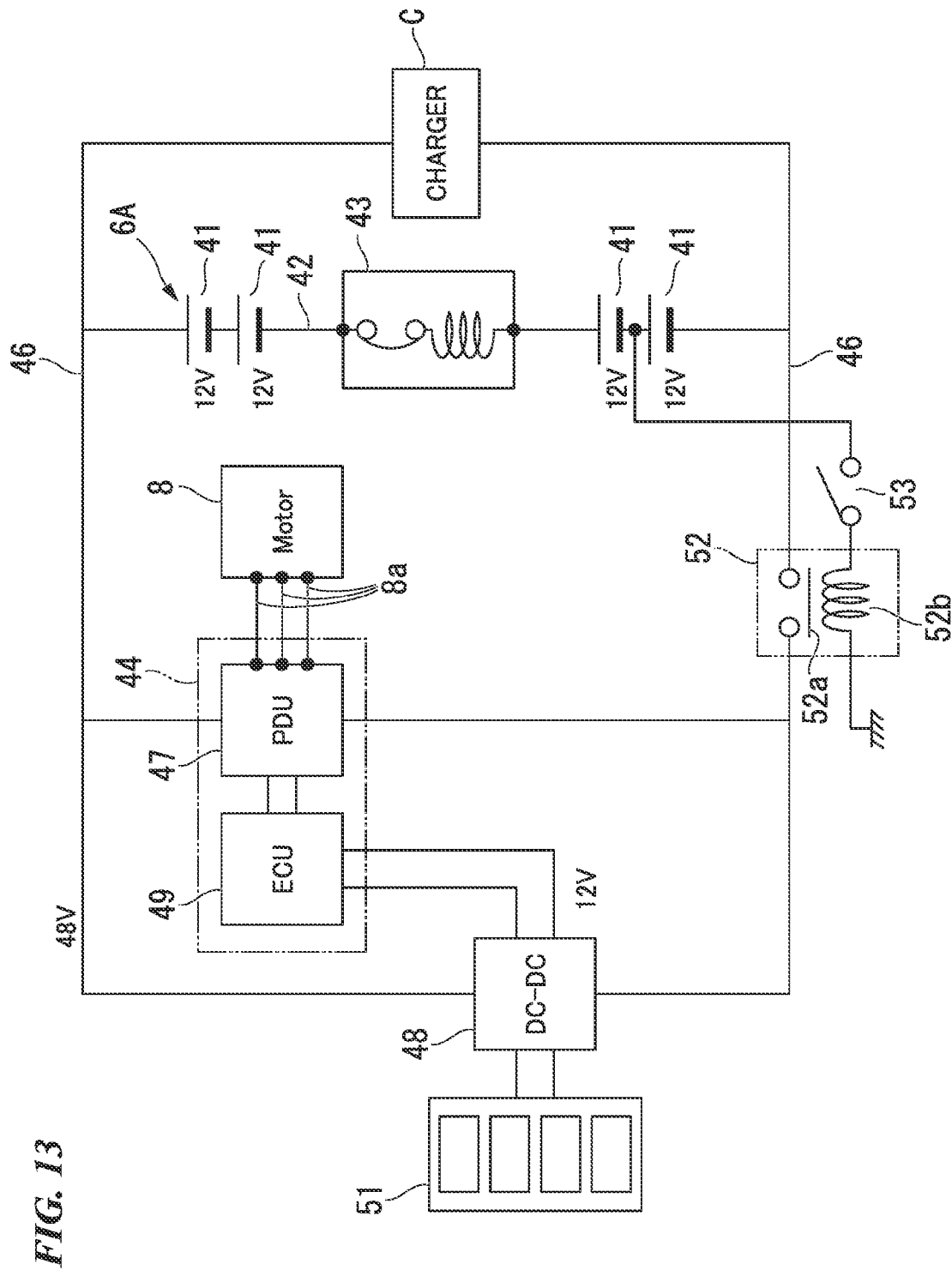
FIG. 13 is a block diagram of the main part of the two-wheeled motor vehicle.

As shown in FIG. 13, 48V DC electric current from the high voltage battery 6A is converted into three-phase alternating current via the PDU 47 in the control unit 44, and is then supplied to the driving motor 8, which is a three-phase alternating current motor. Moreover, the 48V DC electric current is voltage-lowered to 12V via a DC-DC converter (hereunder, referred to simply as converter) 48, which is provided as a separate unit from the control unit 44, and is then supplied to the ECU 49 in the control unit 44 and to other general electrical components 51. In the figure, reference symbol C denotes a charger which is provided integrally with or separately from the two-wheeled motor vehicle 1.

Between the negative pole side of the high voltage battery 6A, and the PDU 47 and the negative pole side of the converter 48 there is provided a contactor 52.

The contactor 52 is provided with a relay circuit, and to one of the terminals of a switch 52a of this relay circuit there is connected the output cable 46, which extends from the negative pole side of the high voltage battery 6A. The other terminal of the switch 52a is connected to the PDU 47 and the negative pole side of the converter 48.

Furthermore, one of the terminals of a coil 52b of the relay circuit is connected to the positive pole side of one of the lead batteries 41 in the high voltage battery 6A via a main switch 53. The other terminal of the coil 52b is grounded. When the main switch 53 is turned ON and electric current from the one of lead batteries 41 flows to the coil 52b, the switch 52a of the relay circuit closes and electric current from the high voltage battery 6A flows to the PDU 47 and the converter 48.

In the figure, reference symbol 8a denotes three phases of motor cables which extend from the control unit 44 (PDU 47) to the driving motor 8. Each motor cable 8a extends so as to transversely cross the vehicle body from the right side of the control unit 44 for example, and then extends along the left arm of the swing arm 18 to reach the driving motor 8 (refer to FIG. 10 and FIG. 14).

The main switch 53 is provided in the vicinity of the head pipe 12 for example (refer to FIG. 1 and FIG. 2).

Moreover, making reference to FIG. 3 and FIG. 9, a main harness 63 arranged between the periphery of the main switch 53 and the control unit 44, extends backward from the vehicle body front part along the left lower frame 23 and the left under pipe 28 and extends upward along the left side of the rear lower pipe 27 and the left rear frame 25, and it then reaches the control unit 44 and the converter 48.

Making reference to FIG. 9 and FIG. 10, the converter 48 is provided at the rear of the control unit 44 and between the left and right rear frames 25 so as to overlap with the left and right rear frames 25 when viewed from the side of the vehicle, and the upper and lower end parts thereof are respectively fastened and supported on the rear upper cross pipe and the rear lower cross pipe.

Figure 8:
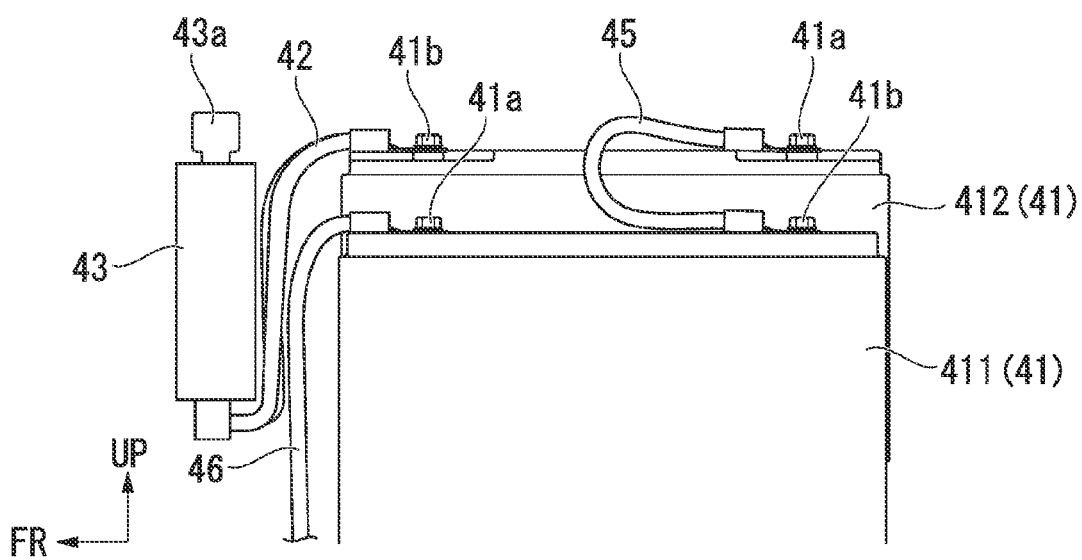
FIG. 8 is a left side view of the high voltage batteries and associated components thereof.

Here, as shown in FIG. 6, FIG. 7, and FIG. 8, the battery unit 6 is such that two lead batteries 41 arranged on the transversely center side thereof (center side batteries 412 and 413) are provided so as to be displaced higher than two lead batteries 41 arranged on the transversely outer sides (side batteries 411 and 414). As a result, even in the case of performing an operation of connecting the respective cables 42, 45, and 46 to the respective terminals 41a and 41b of the lead batteries 41 on the transversely inner side, the lead batteries 41 on the transversely outer sides are unlikely to become an obstacle for the operation, and with the outer corner parts of the upper parts of the lead batteries 41 on the transversely outer side being positioned low, the projecting parts 38 of the under-seat covers (the rear center cover 35 and the left and right rear side covers 36) are unlikely to be conspicuous.

Making reference to FIG. 6, below the battery unit 6 (below the bottom wall 57a of the case main body 57) there is formed a transversely long space 57b surrounded by the lower inner side surfaces of the lead batteries 41 on the transversely outer sides, the bottom surfaces of the lead batteries 41 on the transversely inner side, and the upper surface of the supporting plate 28a. In this space 57b, for example, a brake cable 64 and the like which extend from the periphery of the steering bar handle 2 toward the rear wheel 7 are laid out. The main harness 63 and the output cable 46 may also be laid out in the space 57b.

Making reference to FIG. 7 and FIG. 8, since the intermediate cable 42 connects between the lead batteries 41 on the transversely inner side positioned comparatively at the upper side, the circuit breaker 43 provided on this intermediate cable 42 is arranged on the upper front side of the battery unit 6.

Making reference also to FIG. 5 and FIG. 15, the circuit breaker 43 is supported on a lower supporting plate 43b which is provided to bridge between the left and right frame pipes 62. The lower supporting plate 43b is formed in a transversely long flat plate shape substantially orthogonal to the longitudinal direction, and both ends thereof are respectively welded and fixed on the left and right frame pipes 62. On the upper part of the lower supporting plate 43b there are bent-formed a pair of left and right supporting pieces 43c which extend backward, and both sides of the upper part of the circuit breaker 43 are arranged under these left and right supporting pieces 43c, while these are detachably fastened respectively with left and right bolts 43d inserted from thereabove. The circuit breaker 43 can be attached to and detached from the lower supporting plate 43b by attaching or detaching the respective bolts 43d.

In this manner, with the circuit breaker 43 being attached to the lead batteries 41 on the connection path which connects the lead batteries 41 on the transversely inner side at comparatively high positions (that is to say, with the circuit breaker 43 being attached on the connection path between the lead battery 412 and the lead battery 413 provided on the transversely inner side), operations to be performed on the circuit breaker 43 are facilitated and the level of influence of water splashed from the road surface can be suppressed.

Moreover, making reference to FIG. 7, with the output cable 46 being connected to the front side terminal of the battery unit 6, and the circuit breaker 43 being arranged also on the front side of the battery unit 6, when removing the high voltage battery 6A, each output cable 46 on both sides can be removed after disengaging the circuit breaker 43 to halve the voltage, and this operation can be performed in a focused manner from the front side of the battery unit 6.

As shown in FIG. 5, FIG. 12, and FIG. 15, in front of the battery unit 6 there is provided an electric power input part 54 which enables recharging of the battery unit 6 with electric power supplied from a power source outside the vehicle. The electric power input part 54 includes a power plug socket (plug-receiving socket) with a grounding electrode that corresponds to a plug (plug connector) of a commercial power source (AC 100V) for example. The electric power input part 54 is supported on an upper supporting plate 54a provided to bridge between the left and right frame pipes 62 above the circuit breaker 43. The power source includes the charger C.

The upper supporting plate 54a is formed in a transversely long inversed-V shape when seen in front view which forms the front surface thereof orthogonal to the longitudinal direction, and both ends thereof are welded and fixed respectively on the left and right frame pipes 62. At the rear of the transversely intermediate part of the upper supporting plate 54a there is arranged the electric power input part 54, and a front end flange part 54b of this electric power input part 54 contacts from the front side with the transversely intermediate part of the upper supporting plate 54a, while these are respectively fastened detachably with left and right screws 54c inserted from the front side. The electric power input part 54 can be attached to or detached from the upper supporting plate 54a by attaching or detaching the left and right screws 54c.

Figure 11:
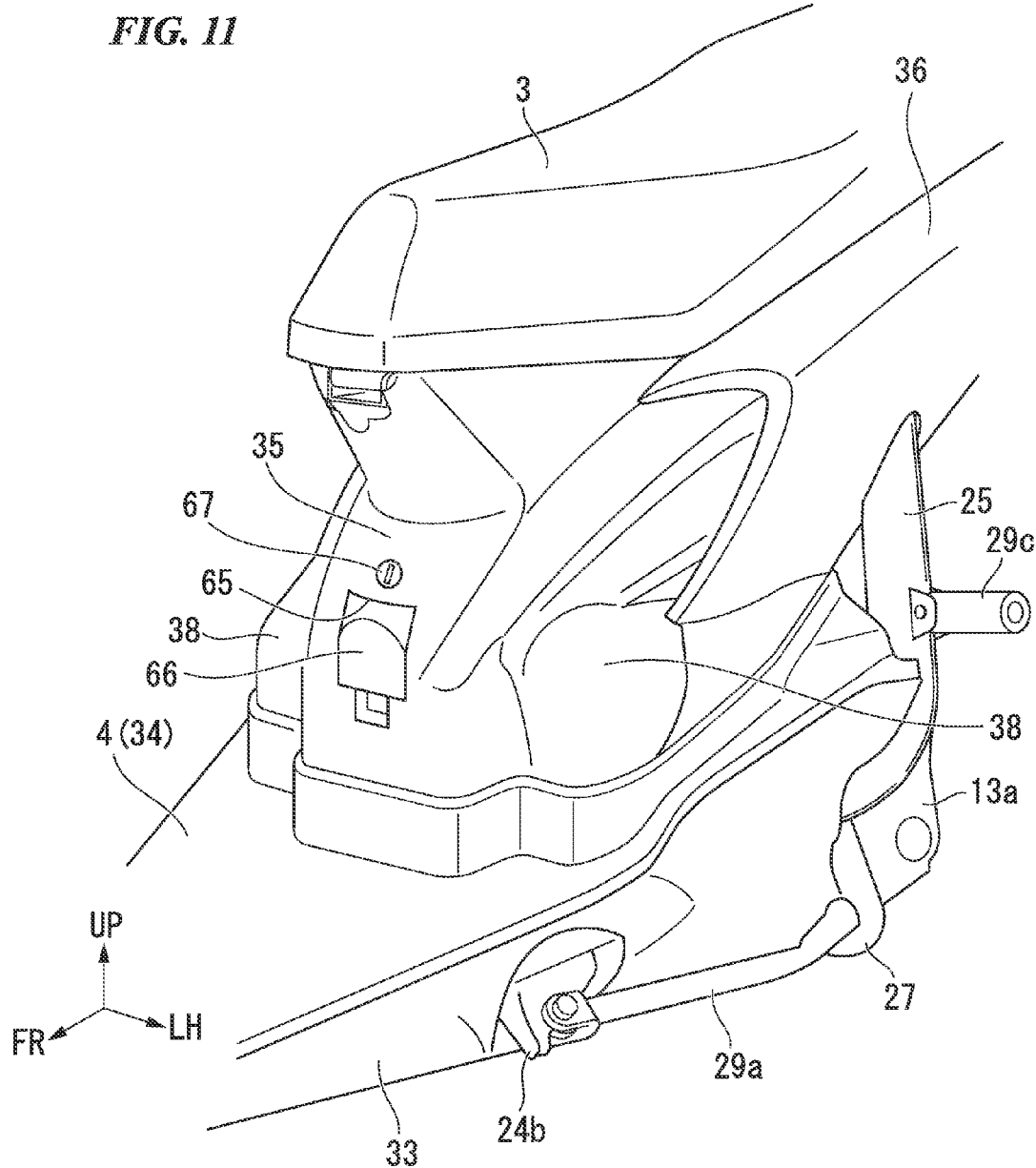
FIG. 11 is a perspective view of the vehicle body rear part.

Making reference also to FIG. 4 and FIG. 11, while the circuit breaker 43 and the electric power input part 54 are covered from the front side by the rear center cover 35, in the transversely center part of this rear center cover 35 there is formed an opening 65 which allows access from the outside of the cover to be made to the circuit breaker 43 and the electric power input part 54, which are positioned on the inner side thereof. On the opening 65 there is provided a lid 66 which opens and closes this, and on the rear center cover 35 (or the lid 66) there is provided a locking mechanism 67 capable of locking the lid 66 in the closed state.

As a result, operations of engaging and disengaging the circuit breaker 43, and attaching and detaching the plug to the electric power input part 54 (charging operation) can be facilitated, and tampering with the electric power input part 54 and the circuit breaker 43 can be deterred with the locking mechanism 67. Furthermore, with the lid 66 being closed, water exposure in the event of rain or at the time of vehicle cleaning, and various types of disturbance can be deterred. An illustration of the lid 66 is omitted in FIG. 4. Moreover, the lid 66 may be attachable to and detachable from the rear center cover 35.

As shown in FIG. 5 and FIG. 10, to the right side part of the control unit 44 there are connected three of the motor cables 8a for supplying electric power to the driving motor 8. Each motor cable 8a extends downward from the right side part of the control unit 44 and is then bent backward, and after having been bent downward again in the vicinity of the right rear frame 25, it extends, above the pivot 13, left-downward toward the left side of the vehicle body.

Figure 14:
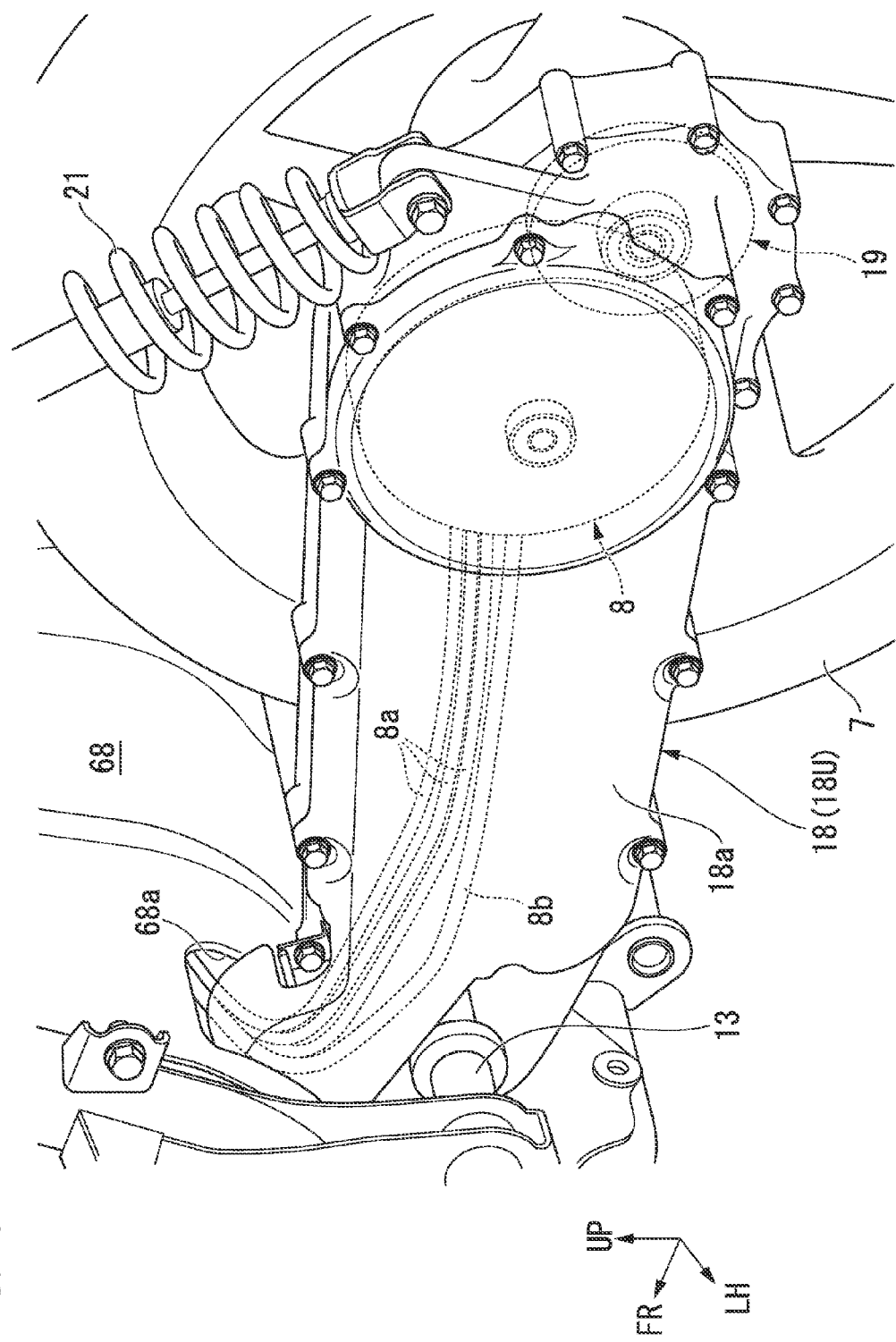
FIG. 14 is a perspective view of a swing unit and associated components thereof of the two-wheeled motor vehicle.

Making reference also to FIG. 14, between the left and right rear frames 25 there is provided a plate-shaped inner rear fender 68 which overlaps therewith when viewed from the side of the vehicle. On the lower left side of this inner rear fender 68 there is formed a cutaway 68a through which the respective motor cables 8a can be guided out from the front side to the rear side thereof. The respective cables 8a guided out to the rear side of the vehicle body through this cutaway 68a extend backward along the left arm of the swing arm 18 and reach the driving motor 8. A detection cable 8b for rotation speed detection (for vehicle speed detection) extends from the driving motor 8 along the respective motor cables 8a. The respective cables 8a and 8b are arranged within an arm cover 18a attached to the outer side of the left arm.

As has been described above, the scooter-type electric vehicle in the embodiment is a two-wheeled motor vehicle 1 provided with: a vehicle body frame 11 which is provided with a down frame 22 extending down-backward from a head pipe 12, and lower frames 23 extending backward from the lower end part thereof; a seat 3 provided at the rear of the head pipe 12 for allowing a passenger to sit thereon; a step floor 4 provided between the head pipe 12 and the seat 3, for allowing the passenger to place their feet thereon; and a battery unit 6 for supplying electric power to a driving motor 8, in which four lead batteries 41 are lined up in the vehicle widthwise direction and are connected in series. The center side batteries 412 and 413 among the respective lead batteries 41, that are arranged on the vehicle center side, are arranged higher than side batteries 411 and 414 which are arranged on the vehicle outer sides, and a circuit breaker 43 is provided on the connection path which connects the center side batteries 412 and 413.

According to this configuration, the serial connection of the respective lead batteries 41 can be cut off easily, and in this state, operations of attaching and detaching the battery unit 6 can be smoothly performed.

Moreover, as a result of the circuit breaker 43 being provided on the connection path of the center batteries 412 and 413, the circuit breaker 43 is arranged at a comparatively high position, enabling an operation to be performed in a superior posture compared to the case of a circuit breaker 43 being arranged at a low position. Furthermore, as a result of the circuit breaker 43 being arranged at a comparatively high position, it is possible to suppress the level of water exposure influence being exerted thereon.

Furthermore, since the upper surfaces of the lead batteries 41 on the vehicle body outer sides are low, the lead batteries 41 on the vehicle body outer sides are unlikely to become an obstacle when performing an operation of connecting the lead batteries 41 on the vehicle center side, and the operation can be efficiently performed as a result.

Moreover, the scooter-type electric vehicle is such that a space 57*b* is formed by the lower inner side surfaces of the side batteries 411 and 414, and the bottom surfaces of the center side batteries 412 and 413.

According to this configuration, since the bottom surfaces of the lead batteries 41 on the transversely outer sides are low, the space 57*b* can be formed by the lower inner side surfaces of the lead batteries 41 on the transversely outer sides, and the bottom surfaces of the lead batteries 41 on the transversely inner side, and members such as wiring and cables can be laid out within this space 57*b*.

Moreover, the scooter-type electric vehicle is such that there is provided a rear center cover 35 which covers the rear of the step floor 4, under the seat 3; in the rear center cover 35 there is provided an opening 65 which enables access (connection) to the circuit breaker 43 from a straddle space M above the step floor 4; and on the opening 65 there is provided a lid 66 which opens and closes this opening 65.

According to this configuration, an operation of disengaging the circuit breaker 43 can be easily performed, and also, the circuit breaker 43 can be covered and hidden when no operation is being performed.

Moreover, the scooter-type electric vehicle is such that at a position facing the opening 65 within the rear center cover 35, there is provided an electric power input part 54 which enables charging of the respective lead batteries 41.

According to this configuration, an operation of recharging the respective lead batteries 41 can be easily performed, and also the electric power input part 54 can be covered and hidden when recharging has been completed.

Furthermore, the scooter-type electric vehicle is such that there is provided a locking mechanism 67 which is capable of locking the lid 66.

According to this configuration, disturbance to the circuit breaker 43 and the electric power input part 54 can be prevented by locking the lid 66.

Moreover, the scooter-type electric vehicle is provided with: a control unit 44 which is provided above the battery unit 6 and controls the driving motor 8; and a swing unit 18U which is swingably supported on the vehicle body frame 11 and has the driving motor 8 built-in. Motor cables 8*a* for supplying electric power from the control unit 44 to the driving motor 8 extend from the vehicle widthwise one side of the control unit 44, and after having extended toward the vehicle widthwise other side at the rear of the battery unit 6, they are guided into the swing unit 18U.

According to this configuration, with the control unit 44 being arranged in the vicinity of the battery unit 6, the motor cables 8*a*, which are high voltage lines, can be shortened to the greatest possible extent. Moreover, the motor cables 8*a* which connect between the control unit 44 and the driving motor 8 are such that portions thereof which extend along the vehicle widthwise direction at the rear of the battery unit 6 can absorb torsion associated with swing of the swing unit 18U, and it is therefore possible to mitigate force exerted in the flexing direction.

The present invention is not limited to the above embodiment, and, for example, nickel hydride batteries or lithium ion batteries may be used instead of lead batteries. Moreover, the battery unit may be configured with a combination of three, or five or more batteries. For example, in the case of combining three batteries, the battery unit is configured such that two batteries are arranged on the transversely inner side, and a battery is arranged on either one of the transversely outer sides.

Furthermore, as a scooter-type electric vehicle to which the invention is applicable, there are not only to two-wheeled vehicles but also three-wheeled (including ones with one front wheel and two rear wheels as well as ones with two front wheels and one rear wheel) and four-wheeled vehicles.

The configuration in the above embodiment is an example of the present invention, and various types of modification may be made thereto, without departing from the scope of the invention.

[Brief Description Of The Reference Symbols]
1 Two-wheeled motor vehicle (scooter-type electric vehicle)
3 Seat
4 Step floor
M Straddle space (space)
5 Vehicle body cover
6 Battery unit
8 Driving motor
8*a* Motor cable (wiring)
11 Vehicle body frame
12 Head pipe
18U Swing unit (unit swing type power unit)
22 Down frame
23 Lower frame
25 Rear frame
29*c* Step
35 Rear center cover (under-seat cover)
41 Lead battery (battery)
43 Circuit breaker (breaker)
44 Control unit (driver)
54 Electric power input part (recharging opening)
57*b* Space
65 Opening
66 Lid
67 Locking mechanism (locking device)
411, 414 Side battery
412, 413 Center side battery

The invention claimed is:

1. A scooter-type electric vehicle comprising:
a vehicle body frame which has a down frame extending down-backward from a head pipe, and a lower frame extending backward from a lower end of this down frame;
a seat, which is provided at the rear of said head pipe, for allowing a passenger to sit thereon;
a step floor, which is provided between said head pipe and said seat, for allowing said passenger to place their feet thereon; and
a battery unit in which at least three batteries each extend in vehicle lengthwise direction and are each lined up in a vehicle widthwise direction and are connected in series to supply electric power to a driving motor, wherein
among said respective batteries, center side batteries that are arranged on a vehicle center side are arranged higher than side batteries that are arranged on vehicle outer sides, and a breaker is fitted to these center side batteries, on a connection path that connects said center side batteries,
one side portion of each battery that extends in the vehicle lengthwise direction directly contacts another side portion of an adjacent battery that extends in the vehicle lengthwise direction, and
there is provided an under-seat cover which covers, below said seat, the rear of said step floor; in said under-seat cover there is provided an opening which enables connection to be established from a space above said step floor to said breaker; and in said opening there is provided a lid which opens and closes this opening.

2. A scooter-type electric vehicle according to claim 1, wherein a lower side surface of each said side battery and a bottom surface of said center side batteries forms a space.

3. A scooter-type electric vehicle according to claim 1, wherein at a position facing said opening within said under-seat cover there is provided a recharging opening which enables recharging of said respective batteries.

4. A scooter-type electric vehicle according to claim 1, wherein there is provided a locking device capable of locking said lid.

5. A scooter-type electric vehicle according to claim 2, wherein:
there are further provided a driver which is provided above said battery unit and which controls said driving motor, and a unit swing type power unit which is swingably supported on said vehicle body frame and has said driving motor built-in; and
a wiring which supplies electric power from said driver to said driving motor extends from vehicle widthwise one side of said driver and extends toward the vehicle widthwise other side at the rear of said battery unit to be guided into said unit swing type power unit.

6. A scooter-type electric vehicle according to claim 1, wherein:
there are further provided steps for allowing a passenger sitting on the rear part of said seat to place their feet thereon; and
said steps are arranged at positions, when seen in side view, at the upper rear of said battery unit which do not overlap with said battery unit.

7. A scooter-type electric vehicle according to claim 6, wherein:
there is further provided a rear frame which extends upward at a backward angle from the rear end of said lower frame; and
at least a part of said rear frame is exposed to the outside of the vehicle body from a vehicle body cover, and said steps are supported at this exposed part of the rear frame.

* * * * *